United States Patent
Ogawa et al.

(10) Patent No.: US 6,333,802 B1
(45) Date of Patent: *Dec. 25, 2001

(54) DIGITAL SIGNAL TRANSMISSION APPARATUS

(75) Inventors: Tetsuo Ogawa; Yoshihiro Morioka, both of Kanagawa; Kenichi Sawaguchi; Fumito Kuramochi, both of Ibaragi, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,788

(22) Filed: Feb. 24, 1998

Related U.S. Application Data

(63) Continuation of application No. PCT/JP97/02156, filed on Jun. 24, 1997.

(30) Foreign Application Priority Data

Jun. 25, 1996 (JP) .................................................. 8-164306

(51) Int. Cl.$^7$ .................................................. H04B 10/12
(52) U.S. Cl. ............................ 359/173; 359/154; 359/158
(58) Field of Search ..................................... 359/154, 158, 359/173

(56) References Cited

U.S. PATENT DOCUMENTS

| | | | |
|---|---|---|---|
| 5,517,232 | * 5/1996 | Heidemann et al. | 348/7 |
| 5,663,823 | * 9/1997 | Suzuki | 359/181 |
| 5,701,186 | * 12/1997 | Huber | 359/125 |
| 5,715,012 | * 2/1998 | Patel et al. | 348/555 |

FOREIGN PATENT DOCUMENTS

| | | | |
|---|---|---|---|
| 4-17483 | 1/1992 | (JP) | H04N/7/22 |
| 4-79530 | 3/1992 | (JP) | H04B/10/12 |
| 4-238428 | 8/1992 | (JP) | H04J/3/00 |
| 4-281646 | 10/1992 | (JP) | H04L/25/03 |
| 4-369931 | 12/1992 | (JP) | H04B/3/04 |
| 5-260450 | 10/1993 | (JP) | H04N/7/08 |
| 06141000 | * 5/1994 | (JP) | 359/173 |
| 6-141000 | 5/1994 | (JP) | H04B/10/10 |
| 06141000 A | * 5/1994 | (JP) | 359/173 |

* cited by examiner

Primary Examiner—Leslie Pascal
Assistant Examiner—Hanh Phan
(74) Attorney, Agent, or Firm—Bell, Boyd & Lloyd LLC

(57) ABSTRACT

An optical transmitter converts serial hi-vision digital signals sent from a transmitting side peripheral device over a coaxial cable into serial digital optical signals to transmit the resulting signals over an optical fiber. An optical receiver receives the serial digital optical signals sent from the optical transmitter over the optical fiber to convert the signals into serial hi-vision digital signals to transmit the converted signals over a receiving side coaxial cable to a receiving side peripheral device. This enables transmission of digital signals to the receiving side peripheral device with suppressed signal deterioration without requiring a complex structure.

7 Claims, 5 Drawing Sheets

DIGITAL SIGNAL TRANSMISSION APPARATUS

This application is a continuation of international application number PCT/JP97/02156, filed Jun. 24, 1997, pending.

TECHNICAL FIELD

This invention relates to a digital signal transmitter in which serial digital signals supplied from a peripheral device such as a video tape recorder or a switcher are first converted into optical signals and subsequently the converted signals are transmitted to the receiver side.

BACKGROUND ART

If, with the use of, for example, a video tape recorder or a switcher as a transmission side peripheral device, it is attempted to transmit full-band high-vision (high definition TV or HDTV) digital signals (not compressed; 1.485 Gbps) from the transmission side peripheral device over a medium to long range distance to a receiving side peripheral device, such as a monitor device, there is known a method of converting parallel hi-vision signals supplied from the transmission side peripheral device via parallel digital interface into serial optical signals by an optical transmission device 51, transmitting the converted serial optical signals over an optical fiber 52 to the optical transmission device 51 to an optical receiving device 53, re-converting the transmitted signals by a parallel digital interface by the optical receiving device 53 and sending the resulting signals over the parallel digital interface to the receiving side peripheral device, as shown in FIG. 1.

There is also known a method of converting analog hi-vision signals, such as Y, Pb or Pr, sent from the transmitting side peripheral device over an analog interface, into optical signals by an optical transmission device 61, transmitting the optical signals over an optical fiber 62 to an optical receiving device 63, re-converting the transmitted optical signals into analog hi-vision signals by the optical receiving device 63 and sending the resulting signals to the receiving side peripheral device, as shown in FIG. 2.

Meanwhile, if parallel hi-vision signals are sent from the transmitting side peripheral device to the optical transmission device 51 via the parallel digital interface or from the optical receiving device 53 to a receiving side peripheral device via the parallel digital interface, as shown in FIG. 1, there is produced transmission delay unbalance between cables. If devices having parallel digital interface are separated a long distance from each other, synchronous detection by the receiving side becomes difficult. Moreover, a large number of transmission circuits are required.

If the transmitting side peripheral devices are connected to the optical transmission device 61 over an analog interface, as shown in FIG. 2, transmission delay unbalance is similarly produced between cables. Moreover, signal deterioration is severer than with digital signals thus necessarily imposing limitations on the distance between devices.

In both of the above methods, plural transmission paths (mediums) such as cables are required between the transmitting side peripheral device and the optical transmitting device, thus increasing the number of connection steps and the system size.

In addition, both methods suffer from an inconvenience in connection with extension of point-to-point connection due to system configurations.

In view of the foregoing, it is an object of the present invention to provide a digital signal transmission device in which sound quality deterioration to the receiving side peripheral device can be suppressed despite the fact that no complex structure is necessitated.

It is another object of the present invention to provide a digital signal transmission device in which plural transmission mediums are not needed for interconnection with the receiving side peripheral devices.

DISCLOSURE OF THE INVENTION

In a digital signal transmission device of the present invention, optical transmission means converts serial hi-vision digital signals sent from a peripheral device over a coaxial cable into serial digital optical signals to transmit the resulting signals by optical transmission. An optical receiver receives the serial digital optical signals sent from the optical transmission means over the optical fiber to convert the signals into serial hi-vision digital signals to transmit the converted signals to a coaxial cable.

There is produced no transmission delay unbalance between the transmitting side peripheral device and the optical transmission means or between optical receiving means and the receiving side peripheral device as occurs with the use of a conventional parallel digital interface or analog interface.

In a digital signal transmission device of the present invention, a plurality of optical transmission means convert serial hi-vision digital signals sent from a transmitting side peripheral device over a coaxial cable into serial digital optical signals, to transmit the resulting signals by optical transmission. A plurality of optical receiving means receive the serial digital optical signals sent from the plural optical transmission means to convert the signals into serial hi-vision digital signals to transmit the converted signals to a receiving side peripheral device.

Since each of the plural optical transmission means has an active loop through-terminal enclosed therein, there is no necessity of constructing the entire system as a parallel type system if there is only one serial digital interface in the transmitting side peripheral device.

BEST MODE FOR CARRYING OUT THE INVENTION

Figure 1:
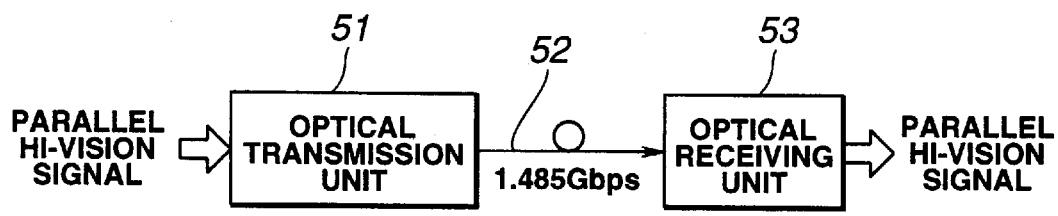
FIG. 1 is a block diagram showing a conventional transmission device for converting parallel hi-vision signals into optical signals and transmitting the resulting optical signals.
Figure 2:
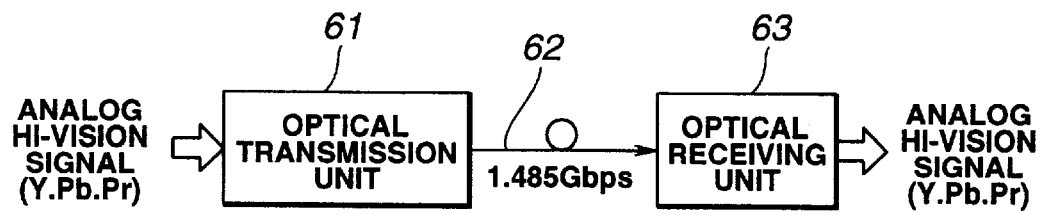
FIG. 2 is a block diagram showing a conventional transmission device adapted for converting analog signals into optical signals and transmitting the resulting optical signals.

Referring to the drawings, preferred embodiments of a digital signal transmission device according to the present invention will be explained in detail.

The present embodiment is directed to a hi-vision digital signal transmission device for transmitting full-band hi-vision (high definition TV or HDTV) digital signals (not compressed; 1.485 Gbps) from a transmission side peripheral device, such as a VTR or a switcher, over a medium to long distance to a receiving side peripheral device, such as a monitor device.

Figure 3:
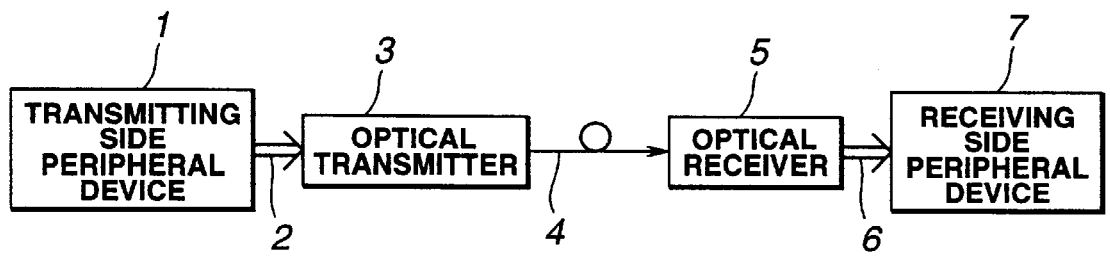
FIG. 3 is a block diagram of a hi-vision digital signal transmission device as an embodiment of a digital signal transmission device according to the present invention.

Referring to FIG. 3, this hi-vision digital signal transmission device includes an optical transmitter 3 for converting serial hi-vison digital signals supplied from a transmitting side peripheral device 1 over a coaxial cable 2 into serial digital optical signals for transmitting the resulting signals over an optical fiber 4 and an optical receiver 5 for receiving the serial digital optical signals sent from the optical transmitter 3 via optical fiber 4, converting the received signals into serial hi-vision digital signals and for supplying the converted signals to a coaxial cable on the receiver side 6. The serial hi-vision digital signals over the coaxial cable 6 are sent to a receiving side peripheral device 7, such as the aforementioned data device.

Figure 4:
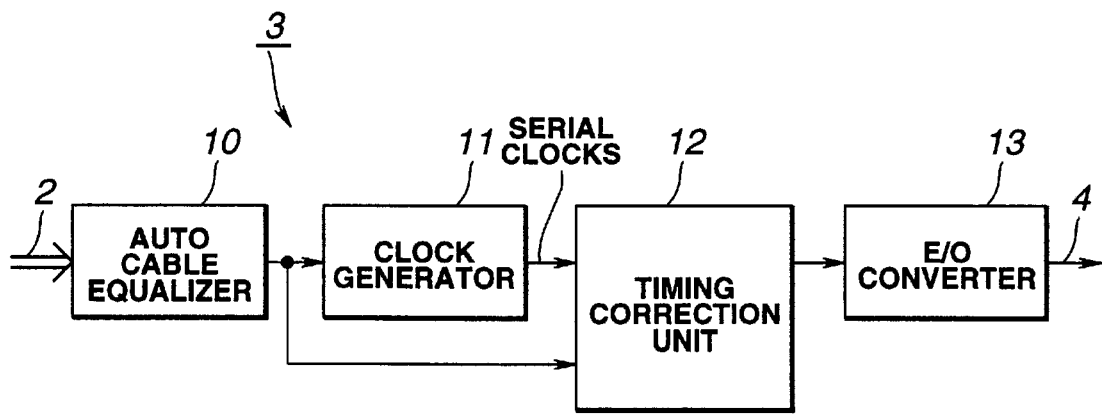
FIG. 4 is a block diagram showing a detailed structure of an optical transmitter used in the hi-vision digital signal transmission device shown in FIG. 3.

The optical transmitter 3 is made up of a cable autoequalizer 10, a clock generator 11, a timing correction unit 12 and an electro-optical (E/O) converter 13, as shown in FIG. 4.

The cable auto-equalizer 10 is connected to a transmitting side peripheral device 1, adapted for outputting hi-vision digital signals over a sole coaxial cable 2 and a coaxial connector, and sets the received hi-vision digital signals to a pre-set level to transmit the resulting signals to the clock generator 11 and the timing correction unit 12. The clock generator 11 extracts the clock frequency from the serial hi-vision digital signals of the pre-set level outputted by the cable auto-equalizer 10 (hereinafter referred to as serial digital signals) to generate serial clocks which are sent to the timing correction unit 12.

The clock generator 11 includes an edge detector 15, a narrow band-pass filter 16 and an amplifier 17. The edge detector 15 converts the serial digital signals into pulse signals which are passed through the narrow band-pass filter 16 to generate serial clocks. This configuration is used because it is difficult with the conventional PLL circuit to follow up with the extremely high transfer rate of 1.485 Gbps to extract the extract clock signals from the above serial digital signals.

Figure 6:
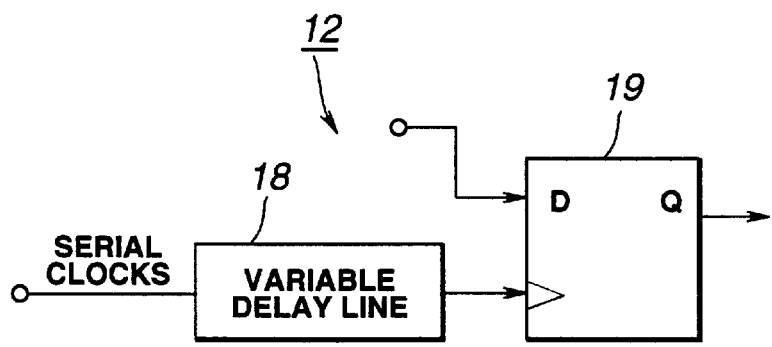
FIG. 6 is a block diagram showing a detailed structure of the optical transmitter shown in FIG. 4.

The timing correction unit 12 includes a variable delay line 18 and a D-flip-flop circuit 19, as shown in FIG. 6. the serial clocks are first passed through a variable delay line 18 for phase matching before being sent to a clock terminal of the D-flip-flop circuit 19. To a data terminal of the D-flip-flop circuit 19 are sent the above serial digital signals from the cable auto-equalizer 10. Thus, the D-flip-flop circuit 19 latches the serial digital signals at the timing of occurrence of the serial clocks to send the signal to the E/O converter 13.

Since the E/O converter 13 converts the serial digital signals into optical signals, serial digital optical signals are entered to the optical fiber 4. The optical fiber 4 is a zero-diffusion single-mode optical fiber for evading deterioration due to mode dispersion. A semiconductor laser is used for the E/O converter 13.

Figure 7:
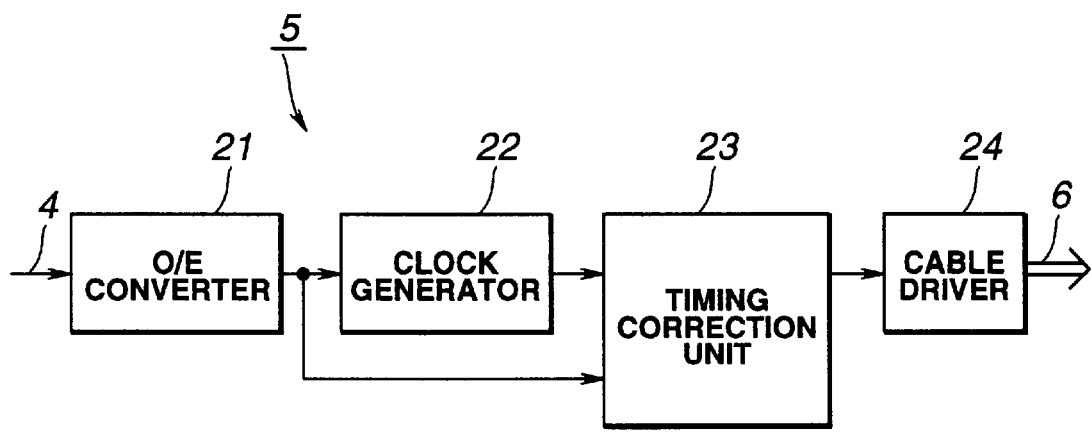
FIG. 7 is a block diagram showing a detailed structure of an optical receiver employed in the hi-vision digital signal transmission device shown in FIG. 4.

The above serial digital optical signals, passed through the optical fiber 4 without deterioration, are sent to an optical receiver 5. As shown in FIG. 7, the optical receiver 5 is made up of an optical/electrical (O/E) converter 21, a clock generator 22, a timing correction unit 23 and a cable driver 24.

Similarly to the clock generator 11, the clock generator 22 handles serial digital signals with a transfer rate of 1.485 Gbps. Thus, the clock generator 22 is configured similarly to the clock generator shown in FIG. 5.

The timing correction unit 23 is configured similarly to the unit shown in FIG. 6. That is, the timing correction unit 23 phase-matches the serial clocks from the clock generator 22 by a variable delay line before sending the phase-matched signals to a clock terminal of the D-flip-flop circuit. To a data input terminal of the D-flip-flop circuit is sent the serial digital signal from the O/E converter 21. Thus, the D-flip-flop circuit latches the serial digital signal at the timing of occurrence of the serial clocks to send the latched signal to the cable driver 24.

The cable driver 24 sends the latched serial digital signals to the coaxial cable 6. The serial digital signals from the coaxial cable 6 is sent to the receiving side peripheral device 7.

The above-described hi-vision digital signal transmission device receives the serial hi-vision digital signals from the transmitting side peripheral device 1 by the optical transmitter 3 over the above-described coaxial cable and converts the hi-vision digital signal by the optical transmitter 3 into serial digital optical signals which are supplied via optical fiber 4 to the optical receiver 5. The optical receiver then converts the serial digital optical signals into serial hi-vision digital optical signals which are supplied over co-axial cable 6 to the receiving side peripheral device 7. Thus, there is no risk of producing transmission delay unbalance between cables interconnecting the transmitting side peripheral device and the optical transmission device or those interconnecting the optical receiving device and the receiving side peripheral device, as in using the parallel digital interface or analog interface, thus enabling transmission of digital signals with suppressed sound quality deterioration to the receiving side peripheral devices.

Figure 8:
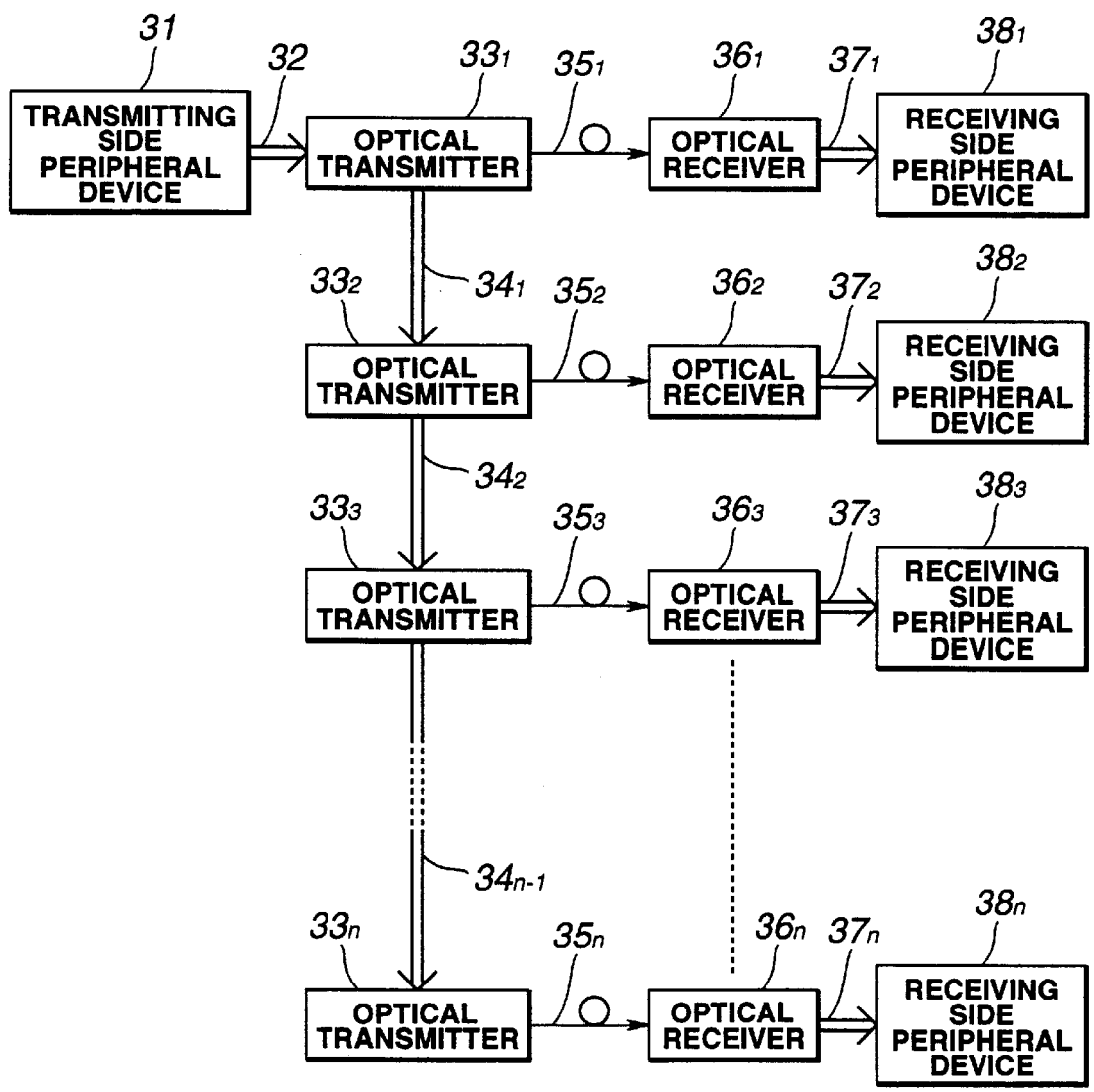
FIG. 8 is a block diagram of a parallel connection type hi-vision digital signal transmission device as an alternative embodiment of the digital signal transmission device according to the present invention.

The digital signal transmission device according to the present invention may be configured as an alternative hi-vision digital signal transmission device shown in FIG. 8.

This embodiment is directed to the above-described hi-vision digital signal transmission device of the parallel connection type having plural stages of the optical transmitters of the above-described system of FIG. 3 arranged in parallel.

This parallel connection type hi-vision digital signal transmission device includes optical transmitters $33_1$, $33_2$, $33_3$, ..., $33_n$ for converting serial hi-vision digital signals supplied from the above-described sole transmitting side peripheral device 31 over coaxial cables 32, $34_1$, $34_2$, ..., $34_{n-1}$ into serial digital optical signals, and optical fibers $35_1$, $35_2$, $35_3$, ..., $35_n$ for optical transmission of the serial digital optical signals obtained by the optical transmitters $33_1$, $33_2$, $33_3$, ..., $33_n$ respectively. The parallel connection type hi-vision digital signal transmission device also includes optical receivers $36_1$, $36_2$, $36_3$, ..., $36_n$ for converting the serial digital optical signals transmitted by these optical fibers $35_1$, $35_2$, $35_3$, ..., $35_n$ into serial hi-vision digital signals. The parallel connection type hi-vision digital signal transmission device additionally includes coaxial cables $37_1$, $37_2$, $37_3$, ..., $37_n$ for transmitting the serial hi-vision digital signals from the optical receivers $36_1$, $36_2$, $36_3$, ..., $36_n$ to plural receiving side peripheral devices $38_1$, $38_2$, $38_3$, ..., $38_n$.

The serial hi-vision digital signals transmitted via serial digital interfacing terminal provided only on the transmitting side peripheral device 31 over the coaxial cable 32 are routed to the optical transmitter $33_1$.

Within the optical transmitter $33_1$ is provided an active loop through-terminal which includes an amplifier and which completes a loop only when an input signal is supplied. The above-described serial hi-vision digital signals are sent over coaxial cable $34_1$ to the optical transmitter $33_2$. Within the optical transmitters $33_2$, $33_3$, ..., $33_n$, there are similarly provided the same active through-terminals adapted for routing the serial hi-vision digital signals over coaxial cables $34_2$, ..., $34_{n-1}$ to the next-stage optical transmitters $33_3$, ..., $33_n$.

The optical transmitters $33_1$, $33_2$, $33_3$, ..., $33_n$ convert the serial hi-vision digital signals, received over the coaxial cables $32_3$ and $34_1$, ..., $34_{n-1}$ into serial digital optical signals which are transmitted through the optical fiber s $35_1$, $35_2$, $35_3$, ..., $35_n$.

The serial digital optical signals transmitted through the optical fiber s $35_1$, $35_2$, $35_3$, ..., $35_n$ are sent to the optical receivers $36_1$, $36_2$, $36_3$, ..., $36_n$ for re-conversion into serial hi-vision digital signals. The hi-vision digital signals from these optical receivers $36_1$, $36_2$, $36_3$, ..., $36_n$ are transmitted over coaxial cables $37_1$, $37_2$, $37_3$, ..., $37_n$ to the plural receiving side peripheral devices $38_1$, $38_2$, 383, ..., $38_n$.

Figure 9:
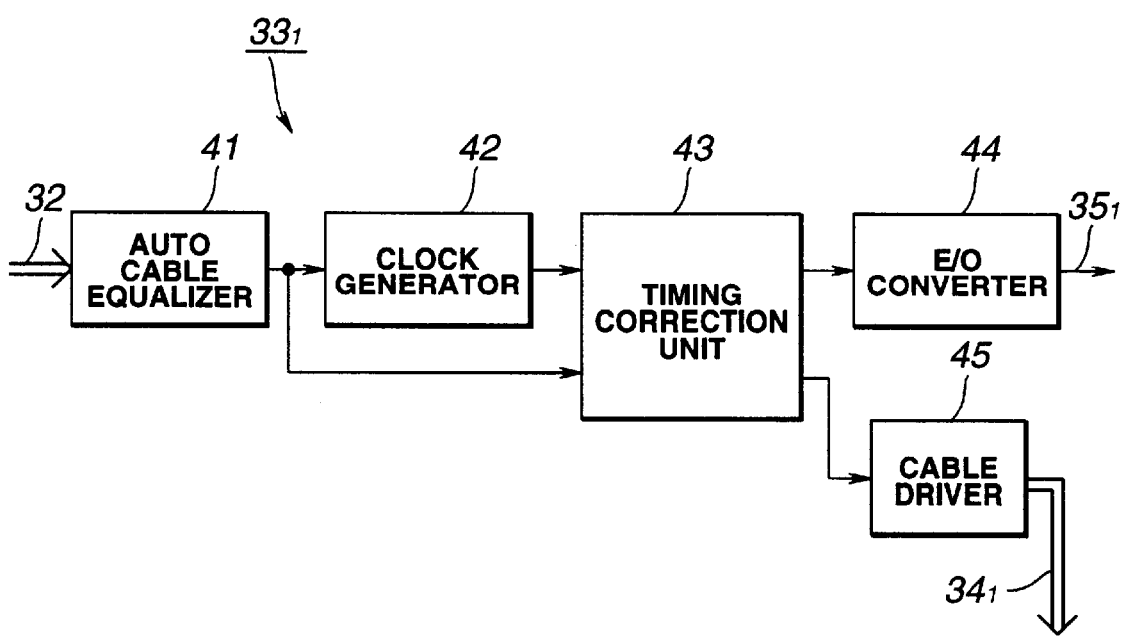
FIG. 9 is a block diagram showing a detailed structure of an optical transmitter employed in the parallel connection type hi-vision digital signal transmission device shown in FIG. 8.

The configuration of the optical receivers $33_1$, $33_2$, $33_3$, ..., $33_n$ is explained with reference to FIG. 9. FIG. 9 shows optical transmitter $33_1$ as an illustrative optical transmitter structure.

This optical transmitter $33_1$ includes above-described cable auto-equalizer 41, a clock generator 42, a timing correction unit 43, an E/O converter 44 and a cable driver 45.

The cable auto-equalizer 41 is connected to a transmitting side peripheral device 31 outputting serial hi-vision digital signals over a coaxial cable 32 and a coaxial connector. The cable auto-equalizer 41 sets the received serial hi-vision digital signals to a pre-set level to send the resulting signals to the timing correction unit 43.

The clock generator 42 extracts the clock frequency from the serial digital signals outputted by the cable auto-equalizer 41 to generate serial clocks which are sent to the timing correction unit 43.

Figure 5:
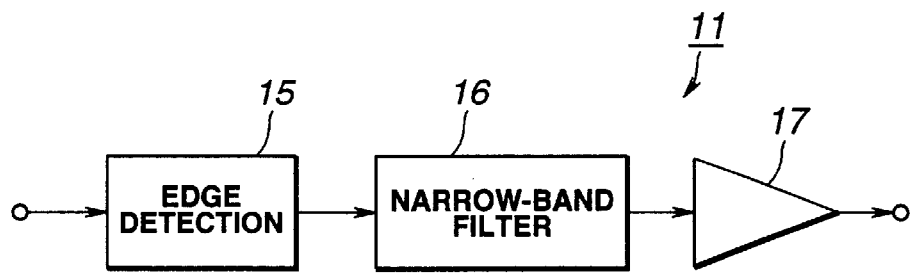
FIG. 5 is a block diagram showing a detailed structure of a clock generator in the optical transmitter shown in FIG. 4.

Similarly to the clock generator shown in FIG. 5, the clock generator 42 includes an edge detection unit 15, a narrow band-pass filter 16 and an amplifier 17. The edge detection unit 15 converts the serial digital signals into pulse signals which are transmitted through the narrow band-pass filter 16 to generate serial clocks. This configuration is used because it is difficult with the conventional PLL circuit to follow up with the extremely high transfer rate of 1.485 Gbps of data to extract the extract clock signals from the data.

The timing correction unit 43 includes a variable delay line 18 and a D-flip-flop circuit 19, as shown in FIG. 6. The serial clocks are first passed through the variable delay line 18 for phase matching before being sent to a clock terminal of the D-flip-flop circuit 19. To a data terminal of the D-flip-flop circuit 19 are sent the above serial digital signals from the cable auto-equalizer 10. Thus, the D-flip-flop circuit 19 latches the serial digital signals at the timing of occurrence of the serial clocks to send the signal to the E/O converter 44.

Since the E/O converter 44 converts the serial digital signals into optical signal, serial digital optical signals are entered to the optical fiber 4. The optical fiber 4 is a zero-diffusion single-mode optical fiber for evading deterioration due to mode dispersion. A semiconductor laser is used for the E/O converter 44.

The cable driver 45 includes the aforementioned active loop through-terminal to transmit the hi-vision digital signals to the coaxial cable $34_1$.

The serial digital optical signals, transmitted through the optical fibers $35_1$, $35_2$, $35_3$, ..., $35_n$ without deterioration, are sent to the optical receivers $36_1$, $36_2$, $36_3$, ..., $36_n$.

The configuration of the optical receivers $36_1$, $36_2$, $36_3$, ..., $36_n$ are similar to that shown in FIG. 7 and hence is not explained specifically.

The above-described parallel-connection type hi-vision digital signal transmitting device of the alternative embodiment has an active through-terminal in each cable driver of each of the optical transmitters $33_1$, $33_2$, $33_3$, ..., $33_n$ thus enabling multi-stage interconnections. Thus, in connecting a sole transmitting side peripheral device 31 to plural receiving side peripheral devices $38_1$, $38_2$, 383, ..., $38_n$ the necessity of constructing the entire system as a parallel type system is eliminated if there is only one serial digital interfacing terminal in the transmitting side peripheral device 31.

With the above-described digital signal transmission device according to the present invention, since the optical transmitting means converts the serial digital signals transmitted from the peripheral device over the coaxial cable into serial digital optical signals and transmits the resulting signals, whilst the optical receiving means receives the serial digital optical signals from the optical transmitting means and converts the received signals into serial digital signals to transmit the resulting signals to the coaxial cable, digital signals transmitted to the peripheral device can be prevented from being deteriorated in signal quality.

Also, with the digital signal transmission device according to the present invention, since the active loop through-terminals are enclosed in the optical transmitting means to allow for multi-stage interconnections, digital signals can be transmitted to plural receiving side peripheral devices despite the fact that there is no necessity of using a complex structure.

What is claimed is:

1. A digital signal transmission apparatus comprising:

optical transmission means for converting serial digital signals sent from a peripheral device over a coaxial cable into serial digital optical signals and transmitting the resulting signals; and optical receiving means for receiving the serial digital optical signals from said optical transmission means, for converting the received serial digital optical signals into serial digital signals and for sending the resulting signals to a coaxial cable, wherein said optical transmission means includes a cable auto-equalizer for setting the serial digital signals to a preset level, a clock generator for extracting a clock frequency from the serial digital signals of a preset level in order to generate serial clock signals, a timing correction unit for receiving the serial clock signals and the serial digital signals of a preset level and for latching the serial digital signals at the timing of the serial clock signals, and an electro-optical converter.

2. The digital signal transmission apparatus as claimed in claim 1 wherein the serial digital signals supplied from said peripheral device over the coaxial cable to said optical transmission means are full-band hi-vision digital signals.

3. The digital signal transmission apparatus as claimed in claim 1 wherein said optical transmission means transmits said serial digital optical signals over an optical fiber to said optical receiving means.

4. The digital signal transmission apparatus as claimed in claim 1 wherein said optical receiving means includes an optical/electrical converter, a clock generator, a timing correction unit and a cable driver.

5. A digital signal transmission apparatus comprising:

a plurality of optical transmission means for converting serial digital signals sent from a sole peripheral device over a coaxial cable into serial digital optical signals and transmitting the resulting signals, each of the optical transmission means including a cable auto-equalizer, a clock generator, a timing correction unit, an electro-optical converter and a cable driver and enclosing an active loop through-terminal in said cable driver, the plurality of optical transmission means interconnected in a multi-stage arrangement via the active loop through-terminal such that one of said optical transmission means directly transmits said serial digital signals to one other neighboring optical transmission means when said one optical transmission means if fed with the serial digital signals, and wherein said one other optical transmission means directly transmits serial digital signals to a remaining other neighboring optical transmission means if said one other optical transmission means is fed with said serial digital signals; and a plurality of optical receiving means for receiving the serial digital optical signals from said optical transmission means, for converting the received serial digital signals into serial digital signals and sending the resulting signals to a coaxial cable.

6. The digital signal transmission apparatus as claimed in claim 5 wherein the serial digital signals supplied from said peripheral device over the coaxial cable to said optical transmission means are full-band hi-vision digital signals.

7. The digital signal transmission apparatus as claimed in claim 5 wherein said optical transmission means transmits said serial digital optical signals over an optical fiber to said optical receiving means.

* * * * *

UNITED STATES PATENT AND TRADEMARK OFFICE
CERTIFICATE OF CORRECTION

PATENT NO.    : 6,333,802 B1                                    Page 1 of 1
DATED         : December 25, 2001
INVENTOR(S)   : Testuo Ogawa et al.

It is certified that error appears in the above-identified patent and that said Letters Patent is hereby corrected as shown below:

<u>Title page,</u>
Item [73], please list the Assignee as follows:

-- Sony Corporation, Tokyo (JP) and Hirakawa Hewtech Corporation, Tokyo (JP) --.

Signed and Sealed this

Seventeenth Day of December, 2002

JAMES E. ROGAN
*Director of the United States Patent and Trademark Office*